R. R. DUPLER.

WEED CUTTER.

APPLICATION FILED MAY 15, 1918.

Reissued Nov. 19, 1918.

14,553.

2 SHEETS—SHEET 1.

INVENTOR

Raymond R. Dupler,

By Owen, Owen & Crampton,

His attys.

R. R. DUPLER.

WEED CUTTER.

APPLICATION FILED MAY 15, 1918.

Reissued Nov. 19, 1918.

14,553.

2 SHEETS—SHEET 2.

INVENTOR.

Raymond R. Dupler,

By Owen, Owen & Crampton,

His attys.

THE MORRIS PETERS CO. PHOTO-LITHO. WASH. D. C.

UNITED STATES PATENT OFFICE.

RAYMOND R. DUPLER, OF MONROE, MICHIGAN.

WEED-CUTTER.

14,553. Specification of Reissued Letters Patent. Reissued Nov. 19, 1918.

Original No. 1,243,495, dated October 16, 1917, Serial No. 138,387, filed December 22, 1916. Application for reissue filed May 15, 1918. Serial No. 234,798.

*To all whom it may concern:*

Be it known that I, RAYMOND R. DUPLER, a citizen of the United States, residing at Monroe, in the county of Monroe and State of Michigan, have invented certain new and useful Improvements in Weed-Cutters; and I do hereby declare the following to be a full, clear, and exact description of the invention, such as will enable others skilled in the art to which it appertains to make and use the same.

This invention relates to a weed cutting attachment for cultivators, and the primary object of the invention is to provide a weed cutting blade which may be positioned forwardly or rearwardly of the cultivating shovels of an ordinary cultivator for cutting the weeds, so that when the weeds are turned by the shovels, they will not right themselves and continue growing, and also to provide a novel form of means for adjustably connecting the weed cutting blade to the beam of an ordinary cultivator structure.

With the foregoing and other objects in view, this invention consists in such novel features of construction, combination and arrangement of parts as will be hereinafter more fully described, illustrated in the accompanying drawings and claimed.

Figure 1:
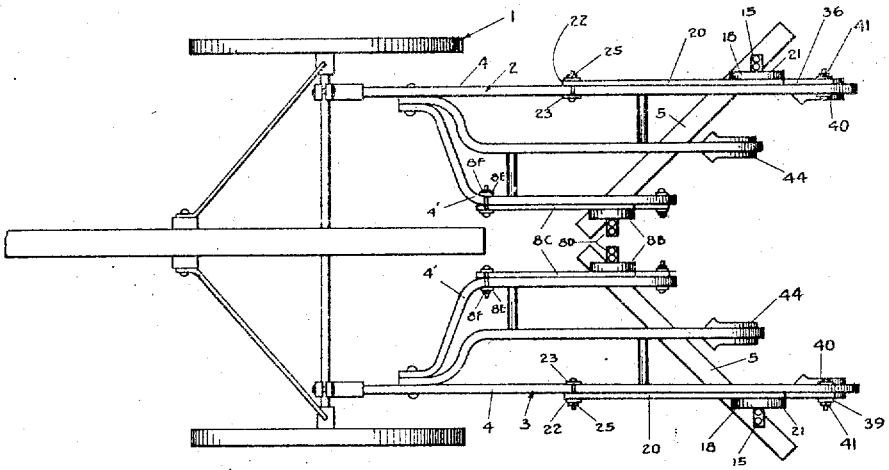
Figure 4:
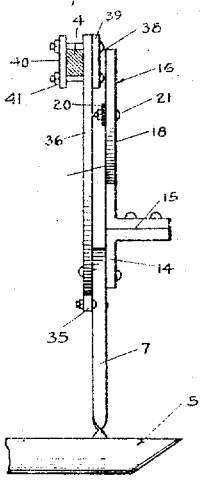
Figure 5:
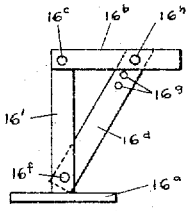
Figure 3:
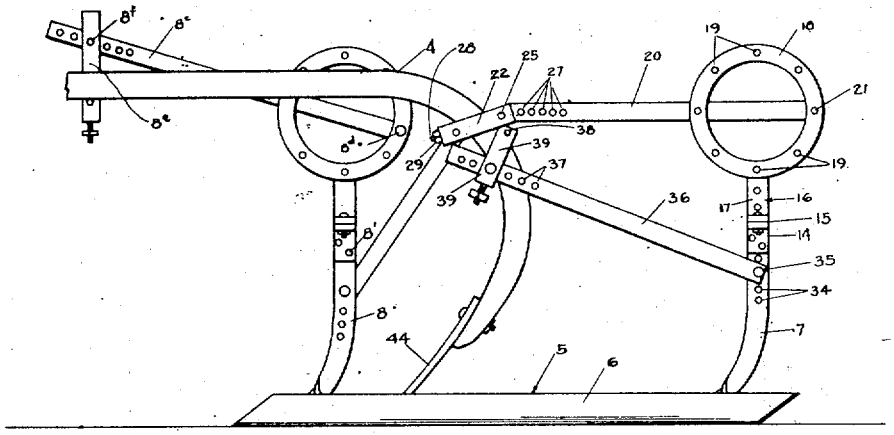
Figure 2:
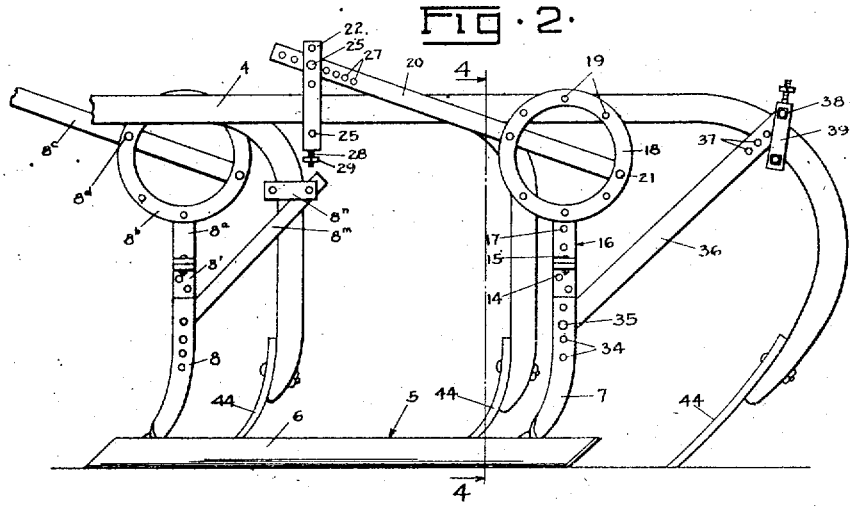

In describing the invention in detail, reference will be had to the accompanying drawings wherein like characters designate like and corresponding parts throughout the several views, and in which:

Figure 1 is a plan view of an ordinary cultivator showing the invention applied thereto, Fig. 2 is a fragmentary view of one gang of cultivating shovels showing the weed cutting attachment applied thereto forwardly of the cultivating shovels, Fig. 3 is a view similar to Fig. 2 showing the weed cutting blade positioned rearwardly of the cultivating shovels, Fig. 4 is a section on the line 4—4 of Fig. 2, Fig. 5 is a modified form of a part of the structure employed for connecting the weed cutting blade to the cultivator beam.

Referring more particularly to the drawings, 1 designates a cultivator of ordinary construction, having gangs 2 and 3 of cultivating shovels, which include the usual type of beams 4 comprising outer beams and inner beams 4′ as clearly shown in Fig. 1 of the drawings.

The weed cutting attachment which is numerically indicated by the numeral 5, includes a weed cutting blade 6, which is bolted, riveted or otherwise suitably fastened to a pair of upstanding standards 7 and 8.

The rearmost standard 7 has an angle bracket 14 attached to its upper end, to which is attached the horizontal portion 15 of a member 16. The member 16 comprises a shank 17 having the horizontally positioned portion 15, which is attached to the angle bracket 14, and a circular portion 18 formed upon its upper end which is provided with a plurality of spaced openings 19. A bar 20 is connected to the circular portion 18 by means of bolts 21 which extend through any two of the openings 19, and extends upwardly and forwardly therefrom, having its forward end adjustably connected to plates 22 and 23, which plates are clamped upon the outer beam 4 by means of bolts 25, the uppermost of which bolts is employed for connecting the bar 20 to the plates 22 and 23. The bar 20 is provided with a plurality of spaced openings 27 to permit of its adjustable connection with the bars 22 and 23.

The plates 22 and 23 are provided for connection to various types of cultivators and the plate 22 is provided with a reduced screw threaded shank 28 formed upon its lower end, upon which a nut 29 is mounted, which structure may be employed for attaching the weed cutter to an ordinary spring tooth cultivator.

The standard 7 is provided with a plurality of openings 34 formed therein in vertical spaced relation through the medium of which openings and a bolt 35, a brace bar 36 is connected to the standard. The brace bar 36 is adjustably connected through the medium of the plurality of spaced openings 37 and a bolt 38 to a bar or plate 39, which plate clamps the upper end of the bar 37 in firm abutting engagement with the rear end of the outer beam 4. A plate 40 is mounted upon the beam 4 oppositely of the plate 39 and is connected to the plate 39 through the medium of the bolt 38 and the plate 40 as clearly shown in Fig. 4 of the drawings.

The standard 8 is attached to the blade 6 adjacent to the forward inner end of the same and it extends upwardly therefrom. An angled plate 8′ is attached to the upper end of the standard 8, and it has its horizontal portion connected to the horizontal end of a bar $8^a$, as clearly shown in Figs. 2 and 3 of the drawings. The bar $8^a$ has a circular portion $8^b$ formed thereon which is identical in construction to the circular portion 18 of the member 16. A bar $8^c$ is connected to the circular portion $8^b$ by bolts as shown at $8^d$ and it extends upwardly and forwardly from the shank 8, having its forward end adjustably connected to the upper end of a clamping structure $8^e$, as shown at $8^f$, which clamping structure is identical to the clamping structure including the plates 22 and 23, as previously described. The standard 8 is braced by a suitable brace $8^m$ which is connected to one of the usual shovel carrying standards of a cultivator by suitable plates $8^n$ as clearly shown in Figs. 2 and 3 of the drawings.

In Fig. 3 of the drawings, the weed cutter is attached to the cultivator rearwardly of the cultivating shovels for cutting any weeds which might have been left by the shovels, and in this view, the plates 22 and 23 are attached to the rear downturned end of the beam 4, and the plates 39 and 40 are also attached to the rear downturned end of the beam 4 below the plates 22 and 23, while the bar 20 extends rearwardly from the downturned end of the beam and is connected to the circular portion 18 of the member 16 for holding the blade 6 to proper elevation with respect to the shovels 44 of the cultivator.

In Fig. 5 of the drawings, a modified form of the member 16 is illustrated, which modified form includes a standard 16′ having a horizontal flange $16^a$ formed upon the lower end which is adapted for connection with the angle bracket 14. A bar $16^b$, which corresponds with the bar 20 is pivotally connected as shown at $16^c$ to the upper end of the standard 16′ and it is held in various adjusted positions by means of a brace $16^d$, which is pivotally connected as shown at $16^1$ to the standard 16′ and is adjustably connected through the medium of a plurality of openings $16^g$ and a bolt $16^h$ to the arm $16^b$.

In reducing the invention to practice, certain minor features in construction, combination and arrangements of parts may necessitate alteration, to which the patentee is entitled provided such alteration is comprehended in the scope of what is claimed.

What is claimed is:

1. The combination with an ordinary cultivator including a plurality of beams, of a weed cutting blade, a pair of standards attached to and extending upwardly from said blade short distances inwardly from its ends, a bar adjustably connected to one of said standards and adapted for connection with one of said beams, an angle bracket attached to the upper end of the other of said standards, members including a shank having a horizontal portion formed upon its lower end and attached to the horizontal portion of said angle bracket, a circular plate formed upon the upper end of said shank, a bar connected to said circular plate, and extending forwardly therefrom, a pair of bars clamped in engagement with one of said cultivator beams, the forward end of said last named bar being adjustably connected to the upper ends of said clamped bars.

2. The combination with an ordinary cultivator including a plurality of beams, of a weed cutting blade, a pair of standards attached to and extending upwardly from said blade short distances inwardly from its ends, a bar adjustably connected to one of said standards and adapted for connection with one of said beams, an angle bracket attached to the upper end of the other of said standards, members including a shank having a horizontal portion formed upon its lower end and attached to the horizontal portion of said angle bracket, a circular plate formed upon the upper end of said shank, a bar adjustably connected to said circular plate, and extending forwardly therefrom, a pair of bars clamped in engagement with one of said cultivator beams, the forward end of said last named bar being adjustably connected to the upper ends of said clamped bars, a brace adjustably connected to said second mentioned standard below said angle bracket, a pair of plates clamped in engagement with one of said beams, said brace being adjustably connected to one of said plates.

3. The combination with an ordinary cultivator including a plurality of beams, of a weed cutting blade, a pair of standards spaced longitudinally thereof and rising therefrom, and a pair of bars for each standard adjustably connected at one end to the standard and extending in opposite directions therefrom and adjustably connected at the outer ends thereof to a respective beam.

4. The combination with an ordinary cultivator including a plurality of beams carrying cultivator shovels, of a weed cutting blade, a pair of standards for each blade spaced longitudinally thereof and rising therefrom, a pair of bars for each standard adjustably connected at their inner ends thereto in vertically spaced relation, and means adjustably connecting the outer ends of said bars to a respective beam.

5. The combination with an ordinary cultivator including a plurality of beams of a weed cutting blade, a standard attached to and rising from said blade, a bar adjustably connected to said standard and adjustably connected to one of said beams, a bracket attached to the upper end of said standard, members including a shank having a horizontal portion formed upon its lower end and attached to a portion of said bracket, a circular plate formed upon the upper end of said shank, a bar connected to said circular plate for circular adjustment relative thereto, and extending therefrom transversely of its axis, and means adjustably connecting the outer end of said last mentioned bar to one of said beams.

6. The combination with an ordinary cultivator including a plurality of beams carrying cultivator shovels, of a weed cutting blade, a pair of standards rising from said blade, a bar adjustably projecting from each standard and connected to one of said beams, a circular plate formed at the upper end of each standard, a bar connected to each of said plates for circular adjustment about its axis, and means adjustably connecting each of said last mentioned bars to respective beams.

In testimony whereof, I have hereunto signed my name to this specification.

RAYMOND R. DUPLER.

Copies of this patent may be obtained for five cents each, by addressing the "Commissioner of Patents, Washington, D. C."